UNITED STATES PATENT OFFICE.

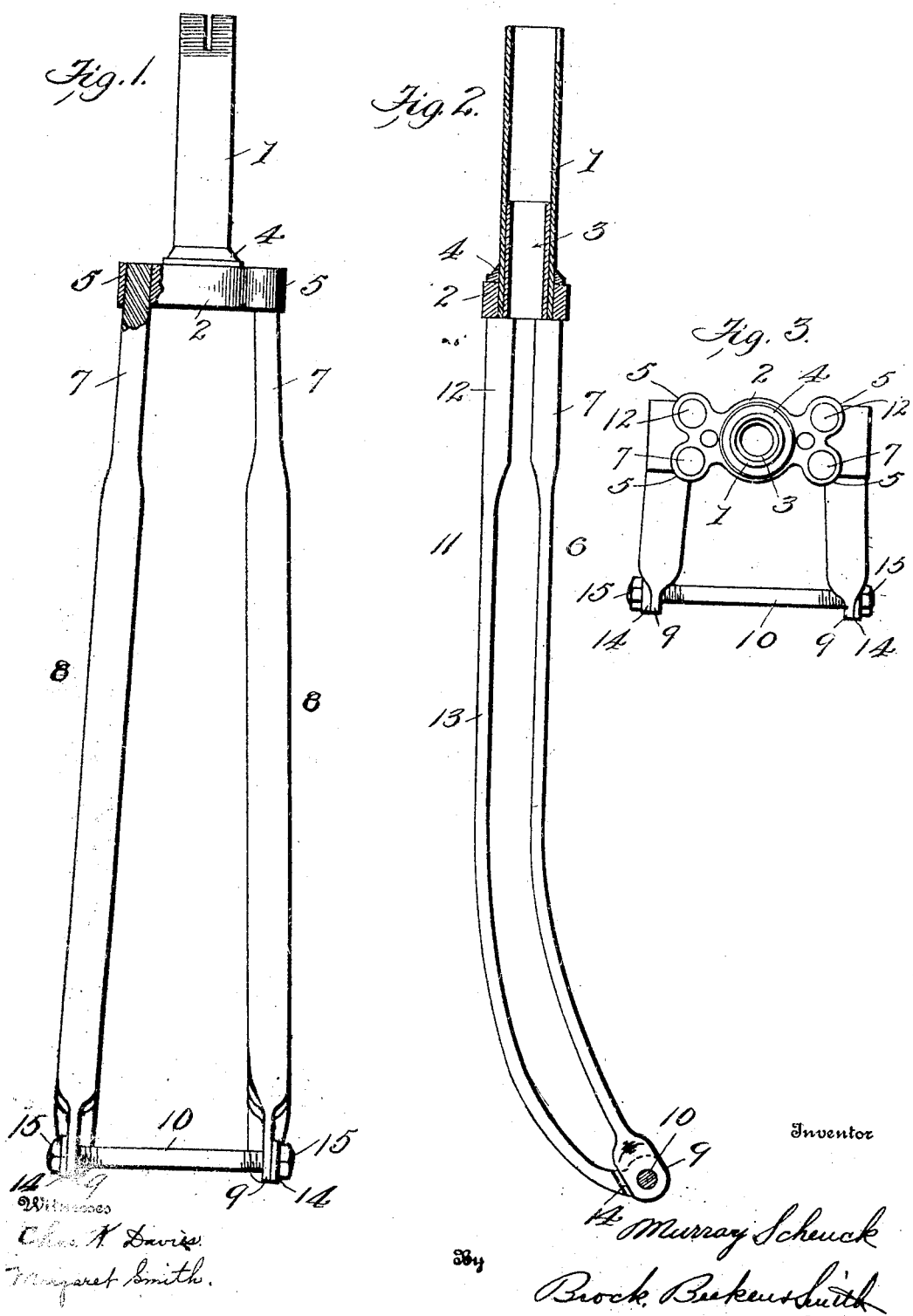

MURRAY SCHENCK, OF MIDDLETOWN, OHIO, ASSIGNOR TO THE MIAMI CYCLE & MANUFACTURING COMPANY, OF MIDDLETOWN, OHIO, A CORPORATION OF OHIO.

SPRING-FORK.

No. 876,021.   Specification of Letters Patent.   Patented Jan. 7, 1908.

Application filed March 18, 1907. Serial No. 363,137.

*To all whom it may concern:*

Be it known that I, MURRAY SCHENCK, a citizen of the United States, and resident of Middletown, in the county of Butler and State of Ohio, have invented a new and useful Spring-Fork, of which the following is a specification.

My invention relates to spring forks for bicycles, tricycles, and other wheeled vehicles. A principal object of the invention is to provide a fork of this character which is reasonably simple, provides flexible spring action and at the same time is amply strong for the purposes for which it is intended.

The characteristics and advantages of the invention are hereinafter more fully set forth and described in connection with a detailed description of the accompanying drawing which illustrates an exemplifying structure embodying the invention.

In the drawing—Figure 1 is a front view of a stem, fork, and axle embodying my invention; Fig. 2, a central vertical section of Fig. 1; and Fig. 3, a plan view.

In the drawing, 1 is the tubular stem; 2, the crown having a central bore entered by the stem; 3, a tubular thimble or reinforcement within the lower end of the stem; 4, a lower bearing cone resting upon the crown; 5, lugs on each side of the crown to receive the springs; 6, the forward springs, two in number, one of which is on each side of the wheel; the upper end of the springs 7 are cylindrical for a short distance and fit in holes in the forward lugs 5 of the crown where they are secured by any suitable means, and the lower part of the springs, comprising the greater part of their length, are flattened so that they present their flat faces toward the front and rear of the vehicle.

9 are the lower ends of springs 6, flattened in an opposite plane to the spring portion 8 and pierced to accommodate the wheel axle 10.

11 are the rear springs, two in number, one on each side of the wheel, having upper cylindrical ends 12 secured in the rear lugs 5 and flat spring portions 13 preferably of greater curvature than springs 8, and oppositely flattened ends 14 pierced to accommodate the axle and lying closely against end portions 9 of springs 6.

15 are nuts on the ends of the axle 10 serving to hold the spring ends in place thereon.

The double spring on each side of the wheel having both ends connected to the axle forms a brace of ample rigidity and yet allows a very free spring action effectively cushioning the movement of the vehicle over inequalities in the road surface. The breakage of any one of the springs will not result seriously since all the springs are positively connected with the crown and axle and the remaining members will support the load. The springs are to be made of any suitable metallic composition for the service for which they are intended.

I claim:

1. In a spring fork, the combination of a crown, an axle, and two spring arms at each side of the wheel having their upper ends rigidly secured in the crown and their lower ends separate and secured to the axle.

2. In a spring fork, the combination of a stem, a crown, an axle, two front springs one on each side of the wheel having cylindrical upper ends rigidly secured in the crown, flat spring portions moderately curved, and flattened lower ends embracing the ends of the axle, and two rear springs, one on each side of the wheel having cylindrical upper ends rigidly secured in the crown, flattened spring portions of greater curvature than similar parts of the forward springs, and flattened lower ends pivotally engaging the ends of the axle.

3. In a spring fork, the combination of a crown, an axle, and two spring fork members arranged one in front of the other on each side of the wheel, connected at their upper ends to the crown and at their lower ends independently to the axle; said fork members having a curvature, the concavity of which is presented toward the front, the curvature of the rear members being greater than that of the front members.

4. A spring fork for cycles comprising a head and spring-arms or tines depending therefrom and provided with bearings at their lower extremities, each tine consisting of double resilient arms extending from the head to the bearings.

In testimony whereof I have affixed my signature in the presence of two witnesses.

MURRAY SCHENCK.

Witnesses:
 GEO. MITCHELL,
 E. M. JACKSON.